(12) United States Patent
Allerkamp et al.

(10) Patent No.: US 11,836,803 B1
(45) Date of Patent: Dec. 5, 2023

(54) FRAUD IDENTIFICATION SYSTEM

(71) Applicant: United Services Automobile Association (USAA), San Antonio, TX (US)

(72) Inventors: Breanna Nicole Allerkamp, Boerne, TX (US); Matthew Conrad Dahlman, Selma, TX (US); Daniel Diaz, San Antonio, TX (US); Andrew Luke Enochs, San Antonio, TX (US); Shawn D. Low, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/244,493

(22) Filed: Apr. 29, 2021

Related U.S. Application Data

(60) Provisional application No. 63/018,257, filed on Apr. 30, 2020.

(51) Int. Cl.
  *G06Q 40/08*  (2012.01)
  *G06N 20/00*  (2019.01)
  *G06F 16/2457*  (2019.01)
  *G06Q 10/10*  (2023.01)

(52) U.S. Cl.
  CPC ....... *G06Q 40/08* (2013.01); *G06F 16/24575* (2019.01); *G06N 20/00* (2019.01); *G06Q 10/10* (2013.01)

(58) Field of Classification Search
  CPC ....................................................... G06Q 40/08
  USPC ............................................................ 705/4
  See application file for complete search history.

(56) References Cited

U.S. PATENT DOCUMENTS

| | | | | |
|---|---|---|---|---|
| 6,826,536 B1* | 11/2004 | Forman | ................... | G06Q 10/10 705/3 |
| 7,813,944 B1* | 10/2010 | Luk | .......................... | G06Q 10/10 705/2 |
| 2005/0097051 A1* | 5/2005 | Madill, Jr. | ............. | G06Q 20/04 705/50 |
| 2010/0145734 A1* | 6/2010 | Becerra | ................... | G06Q 40/08 705/4 |
| 2011/0015948 A1* | 1/2011 | Adams | ................. | G06Q 10/087 704/2 |
| 2013/0226623 A1* | 8/2013 | Diana | .................... | G06Q 40/08 705/4 |

(Continued)

*Primary Examiner* — Robert R Niquette
(74) *Attorney, Agent, or Firm* — Fletcher Yoder, P.C.

(57) ABSTRACT

To enable efficient processing of an insurance claim that is submitted by a client, the presently disclosed embodiments include systems and methods that enable an insurance computing system to autonomously assess the risk of fraud associated with a claim by generating a risk score. The risk score may provide an indication of a likelihood of fraud associated with the claim based on similar insurance claims in the same geographical area, client information indicative of a likelihood to commit fraud, and/or a type of the claim. The insurance computing system may compare the risk score with a threshold number, and if the threshold number is exceeded, the insurance computing system may prompt the client to contact a service representative to further process or validate the claim. Otherwise, if the threshold number is not exceeded, the insurance computing system may continue processing the claim autonomously.

20 Claims, 2 Drawing Sheets

(56) References Cited

U.S. PATENT DOCUMENTS

2016/0379309 A1* 12/2016 Shikhare ............... G06Q 40/08
705/4

* cited by examiner

FRAUD IDENTIFICATION SYSTEM

CROSS-REFERENCE TO RELATED APPLICATION

This application claims the benefit of U.S. Provisional Application Ser. No. 63/018,257, entitled "FRAUD IDENTIFICATION SYSTEM," filed Apr. 30, 2020, which is hereby incorporated by reference in its entirety for all purposes.

BACKGROUND

The present disclosure relates generally to identifying fraudulent insurance claims. More specifically, the present disclosure relates to providing insurance providers a way to assess the potential risk of fraud associated with a client's insurance claim.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Many consumers have insurance policies for their property, such as their home or car. Insurance companies may struggle to prioritize paying out consumers promptly while attempting to determine if a claim is fraudulent. To validate claims as efficiently as possible, insurance companies may use a digital or autonomous system. However, a human adjuster may be better suited to determine which claims are fraudulent or analyze claims that are suspected to be fraudulent.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes one or more processors and memory communicatively coupled to the one or more processors, the memory storing instructions which, when executed by the one or more processors, cause the one or more processors to receive an insurance claim and indicate that a claim validation process for the insurance claim is starting. The instructions also cause the one or more processors to determine one or more fraud indicators associated with the insurance claim. The one or more fraud indicators indicate a likelihood of fraud in the insurance claim. The instructions further cause the one or more processors to determine whether the insurance claim is likely fraudulent based on the one or more fraud indicators; and, in response to determining that the insurance claim is likely fraudulent, indicate that the insurance claim validation process for the insurance claim is stopping and send a notification to contact a service representative.

In one embodiment, a method includes receiving, via at least one processor, an insurance claim and determining, via the at least one processor, one or more fraud indicators associated with the insurance claim. The one or more fraud indicators indicate a likelihood of fraud in the insurance claim. The method also includes determining, via the at least one processor, that the insurance claim is likely fraudulent based on the one or more fraud indicators, and, in response to determining that the insurance claim is likely fraudulent, sending, via the at least one processor, a notification to contact a service representative.

In one embodiment, one or more non-transitory computer-readable media storing instructions that, when executed by at least one processor, cause the at least one processor to receive an insurance claim, indicate that a claim validation process for the insurance claim is starting, and determine one or more fraud indicators associated with the insurance claim. The one or more fraud indicators indicate a likelihood of fraud in the insurance claim. The instructions also cause the at least one processor to determine whether the insurance claim is likely fraudulent based on the one or more fraud indicators and, in response to determining that the insurance claim is likely fraudulent, indicate that the claim validation process for the insurance claim is stopping, and send a notification to contact a service representative. The instructions further cause the at least one processor to, in response to determining that the insurance claim is not likely fraudulent, validate the insurance claim.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
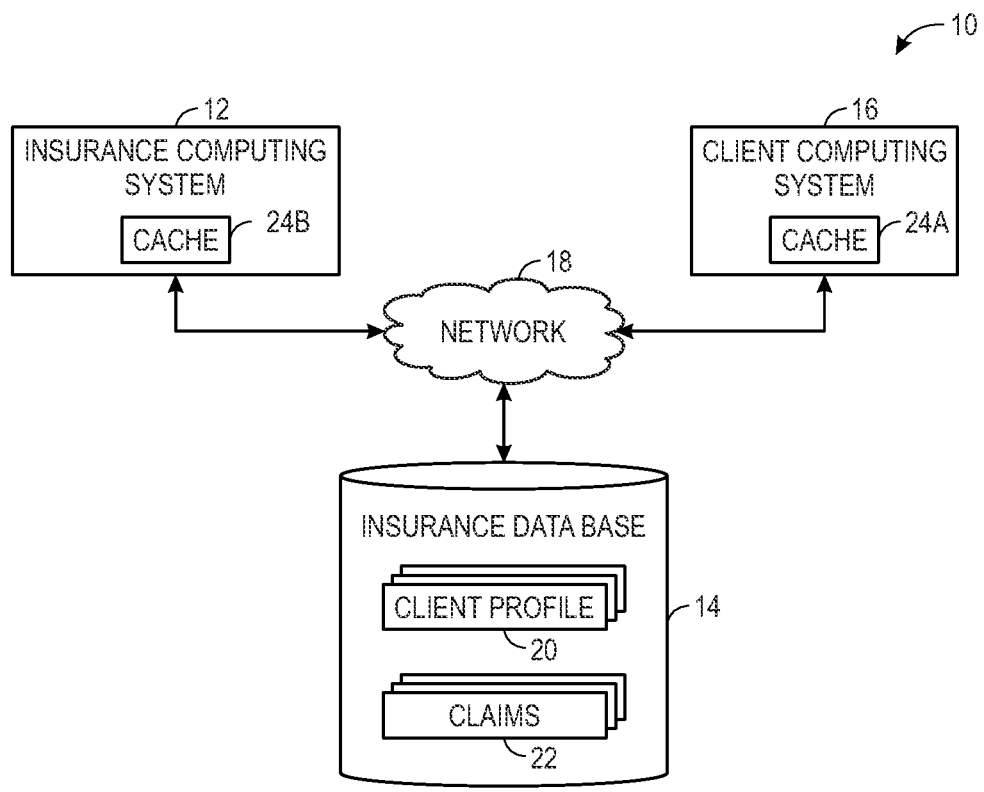
FIG. 1 is a diagram of a claim processing system that validates insurance claims, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

To enable efficient processing of an insurance claim (e.g., data describing and indicating a claim on insurance) submitted by a client or user, the presently disclosed embodiments include systems and methods that enable autonomously assessing a risk of fraud associated with a claim by generating a risk score based on monitoring data and the like. An insurance claim includes a request by a policyholder to an insurance company for coverage or compensation for a covered loss or policy event. The risk score may provide an indication of a likelihood of fraud associated with the claim based on similar insurance claims in the same geographical area, client information indicative of a likelihood to commit fraud, and/or a type of the claim. In one embodiment, an insurance computing system may compare the risk score with a threshold number, and if the threshold number is exceeded, the insurance computing system may prompt the client to contact a service representative (e.g., a live person) to further process or validate the claim. Otherwise, if the threshold number is not exceeded, the insurance computing system may continue processing the claim autonomously. Although these concepts are discussed in relation to property insurance, these concepts could generally apply to determining fraud in other types of insurance claims as well (e.g., health insurance, life insurance, general liability insurance, disability insurance, pet insurance).

Various refinements of the features noted above may exist in relation to various aspects of the present disclosure. Further features may also be incorporated in these various aspects as well. These refinements and additional features may exist individually or in any combination. For instance, various features discussed herein in relation to one or more of the illustrated embodiments may be incorporated into any of the herein-described aspects of the present disclosure alone or in any combination.

Insurance providers are interested in providing an efficient way to process their client's insurance claims. For example, a client may file or submit an insurance claim to their insurance provider. Once the claim is submitted, the insurance provider may validate the claim. Validating the claim may include checking for fraud, assessing the damage to the property, determining when the damage occurred, determining who was at fault, determining how much to pay out, among other things. In many cases, an adjuster may check whether the claim is fraudulent. However, having adjusters check each claim to ensure that the claim is not fraudulent may be time-consuming and inefficient. To enable efficient processing of the client claims, the presently disclosed embodiments include systems and methods that enable an insurance computing system to autonomously assess the risk of fraud associated with a claim by generating a risk score. The risk score may provide an indication of a likelihood of fraud associated with the claim based on similar insurance claims in the same geographical area, client information indicative of a likelihood to commit fraud, and/or a type of the claim. In one embodiment, the insurance computing system may compare the risk score with a threshold number, and if the threshold number is exceeded, the insurance computing system may prompt the client to contact a service representative (e.g., a live person) to further process or validate the claim. Otherwise, if the threshold number is not exceeded, the insurance computing system may continue processing the claim autonomously. Although these concepts are discussed in relation to property insurance, these concepts could generally apply to determining fraud in other types of insurance claims as well (e.g., health insurance, life insurance, general liability insurance, disability insurance, pet insurance).

With the preceding in mind, FIG. 1 is a diagram of a claim validation system 10 that validates insurance claims, in accordance with embodiments described herein. The claim validation system 10 may assist insurance companies to efficiently validate a claim that their client submits. As illustrated, the claim validation system 10 may include an insurance computing system 12, an insurance database 14, and a client computing system 16, that may be communicatively coupled together by a network 18. A client may use the client computing system 16 to submit a claim to the insurance computing system 12. Subsequently, the insurance computing system 12 may query the insurance database to facilitate generating a risk score associated with the claim that indicates a likelihood of fraud associated with the claim. If the risk score exceeds a threshold, the insurance computing system 12 may prompt the client to contact service representative for further assistance.

Figure 2:
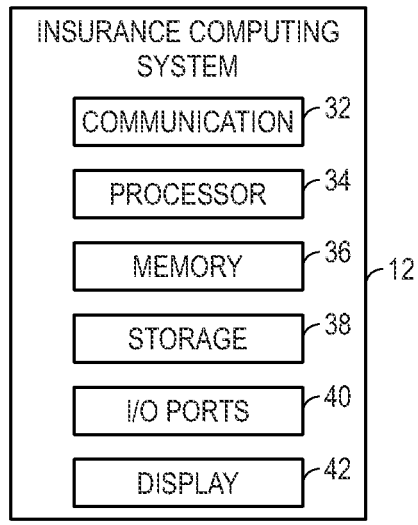
FIG. 2 is a block diagram of an insurance computing system employed by the claim processing system of FIG. 1, in accordance with embodiments described herein.

The insurance computing system 12 may include any suitable computing device including, for example, one or more processors and one or more memory or storage devices, as discussed in more detail below with reference to FIG. 2. In certain embodiments, the insurance computing system 12 may include a laptop computer, a personal computer, tablet, server, smart phone, a virtual machine, cloud-based computing system, and the like.

A client (e.g., a policyholder) may interact with the insurance computing system 12 by way of the client computing system 16. The client computing system 16 may be any suitable computing device, similar to the insurance computing system 12 that is discussed in more detail below with reference to FIG. 2. In certain embodiments, the client computing system 16 may be a mobile computing device (e.g., smart phone, tablet, laptop computer, desktop computer, wearable device) capable of sending and receiving data to and from the insurance computing system 12 over the network 18.

With the foregoing in mind, the client may submit an insurance claim via the client computing system 16. The client computing system 16 may execute a smart phone application, a web browser, or the like, that enables the client to enter the relevant information to submit an insurance claim to be reviewed (e.g., validated). In particular, the client computing system 16 may display one or more forms with fields for the client to fill. The fields may correspond to identification information of the client and/or claim information (e.g., what was damaged, amount associated with repair or replacement, when the damage occurred, among other things). In some embodiments, at least some of the fields related to client information may be automatically populated by data previously entered by the client.

The insurance computing system 12 may receive the claim (e.g., including claim information provided by the client entering the data into the fields) and, in some cases, query the insurance database 14 to confirm the clients identifying information. The insurance computing system 12 may further query the insurance database 14 for information that may provide indications of whether the claim is fraudulent, and use the information to generate a risk score for the claim and/or the client. Additional details with regard to the information used to generate the risk score and how the risk score is generated by the insurance computing system 12, insurance database 14, and the client computing system 16 will be discussed below with reference to FIG. 3.

In some embodiments, to perform their respective operations, the insurance computing system 12 may retrieve data from one or more insurance databases 14. The insurance database 14 may include information associated with the client (e.g., name, address, phone number, policy number, assets owned, assets insured, occupation, and the like). Further, the insurance database 14 may include information regarding weather reports, crime incident reports (e.g., crimes that may have occurred in a designated geographical area), criminal background history reports, information from a third-party database, such as a Geographic Information System, among other things. In some embodiments, the insurance database 14 may include identifying information with regards to the insured property or object. For example, the insurance database 14 may include an image of an insured vehicle that may have been taken at an earlier period of time relative to when a claim for damage to the vehicle is being filed.

In some embodiments, the insurance database 14 may store client profiles 20 and claims 22. The client profiles 20 may store information associated with each respective client, such as identification information, biographical information, the number of claims previously submitted, the type of claims previously submitted, if any previous submission was determined to be fraudulent (e.g., client claim history), client criminal history, and so on. Additionally or alternatively, the client profile 20 may include identifying information associated with the client such as biometric data. In some embodiments, the biometric data may include fingerprint data, facial imaging data, and/or voice data. The claims 22 may include the claim information entered by the client through the client computing system 16, as well as any relevant information associated with the claims 22 that the insurance provider may find useful (e.g., claim identification number, police reports, type of claim, images of damage, date of occurrence, among other things). Each of the claims 22 may be associated with a client profile 20 (corresponding to the client who filed a particular claim) via a pointer, link, or field in the insurance database 14. For example, each of the claims 22 may store a client identification number that is unique to a particular client profile, and thus may serve to link the particular claim (of the claims 22) to the particular client profile (of the client profiles 20).

The network 18 may be any suitable computer network that enables different electronic devices (e.g., servers), communication components (e.g., routers), and the like to facilitate the communication between the insurance computing system 12 and other components that may be part of the claim validation system 10. In certain embodiments, the insurance computing system 12, the insurance database 14, and the client computing system 16 may be in direct communication with one another via a respective communication channel. However, it should be noted that each of the aforementioned devices may also be coupled to each other via the network 18, as discussed above.

In some embodiments, the client computing system 16 and/or the insurance computing system 12 may include a cache 24 (respectively shown as 24A and 24B), such as a locally stored database, a local cache, a database cache, a remote cache, or the like.

The cache 24 may store search results for one or more geographical areas to enable lower latency and/or faster search results. As such, in certain embodiments, the cache 24 may be implemented as a local database in one or more memory and/or storage devices of the client computing system 16 and/or the insurance computing system 12. For example, the search results may correspond to frequently requested search queries, and thus provide faster search times and more efficient searching for a geographical area. Retrieving these search results from the cache 24 (which may be stored locally on the client computing system 16 and/or the insurance computing system 12, such that traversing the network 18 may not be necessary for the client computing system 16 and/or the insurance computing system 12 to retrieve the search results) may be faster and more efficient than, for example, performing the searches and receiving search results from a remote database (e.g., the insurance database 14) that may be accessible via the network 18. Moreover, network traffic associated with retrieving the data over the network 18 may be reduced or eliminated altogether, resulting in less network congestion.

To perform some of the operations described in the present disclosure, the insurance computing system 12 may include certain components to facilitate these operations. With this in mind, FIG. 2 is a block diagram of example components within the insurance computing system 12, in accordance with embodiments described herein. Referring to FIG. 2, the insurance computing system 12 may include a communication component 32, a processor 34, a memory 36, a storage 38, input/output (I/O) ports 40, a display 42, and the like. The communication component 32 may be a wireless or wired communication component that may facilitate communication using the network 18, such as to communicate with the insurance database 14, the client computing system 16, and any other device accessible by the network 18.

The processor 34 may be any type of computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may include computer-readable media (e.g., any suitable form of memory or storage) that may store the processor-executable code used by the processor 34 to perform the presently disclosed techniques. The memory 36 and the storage 38 may also store data, analysis of acquired data, various other software applications, and the like. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and may not include a signal.

The I/O ports 40 may be interfaces that may couple to other peripheral components such as input devices (e.g., keyboard, laser scanner, mouse, microphone), sensors, input/output (I/O) modules, and the like. The display 42 may operate to depict visualizations associated with software or executable code being processed by the processor 34. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen).

It should be noted that the components described above with regard to the insurance computing system 12 are exemplary components and the insurance computing system 12 may include additional or fewer components as shown. Additionally, it should be noted that the client computing system 16 may also include similar components as described as part of insurance computing system 12.

Although the embodiments described herein are detailed as being performed by the insurance computing system 12, it should be noted that the presently disclosed techniques may be performed in conjunction with a cloud-based computing system, a server, or the like. For example, the insurance computing system 12 may receive an insurance claim 22 from a client computing system 16, and the insurance computing system 12 may validate the claim 22 with the additional computing resources provided by a server, a cloud-computing system, a virtual machine, or the like. In some embodiments, the insurance computing system 12 may use a software application, which may be stored in the memory 36, and executed by the processor 34 to perform the embodiments described herein. The computer application may access the computing resources of the insurance computing system 12 to perform its operations or interact with the computing resources of another connected computing system (e.g., cloud-computing system). In any case, for the purposes of discussion, the presently disclosed techniques will be described as being performed by insurance computing system 12. As such, it should be understood that the presently disclosed techniques are not limited to being performed by the insurance computing system 12.

Figure 3:
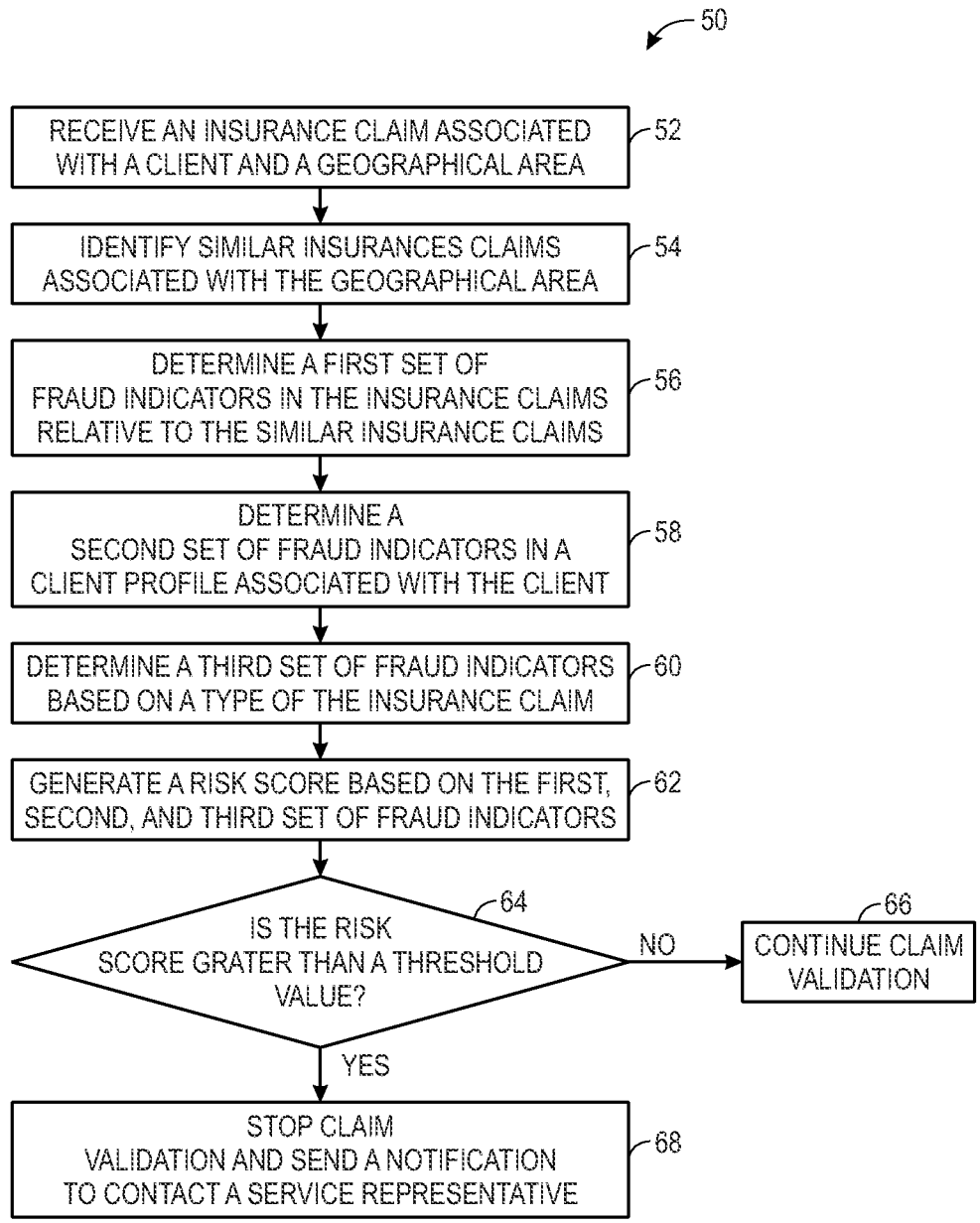
FIG. 3 is a flowchart of a method for submitting an insurance claim, in accordance with embodiments described herein.

FIG. 3 is a flowchart for a method 50 for validating an insurance claim (e.g., one of the claims 22), in accordance with embodiments described herein. The steps of the method 50 may be performed in any suitable order, stored as machine-readable instructions in the memory 36 and/or storage 38, and performed by any suitable processing device, such as the processor 34. For purposes of this discussion, the method 50 will be described as being performed by the insurance computing system 12, though any suitable computing device is contemplated for performing at least some steps of the method 50, including the client computing system 16.

With this in mind, the insurance computing system 12, at block 52, receives an insurance claim associated with the client and a geographical area from the client computing system 16. In particular, the client (e.g., claimant) may enter the claim on a graphical user interface provided by the insurance provider on the client computing device 16 via the network 18. For example, the client computing device 16 may access the graphical user interface using a software application developed by the insurance provider and installed on the client computing device 16, a website managed and/or with content developed by the insurance provider, or the like. As or after the client enters information about the insurance claim on the graphical user interface, the graphical user interface may indicate that a claim validation process has started.

The claim may include details about the insured item, the type of damage, the estimated cost of repair, the estimate cost of replacing, and the like. In some embodiments, the claim may also include images of the property to detail the damage or loss that may have occurred. The claim may be associated (e.g., via pointing or linking information that may be stored in the insurance database 14) with a client profile, such as one of the client profiles 20. As discussed above, the client profile may store information that may be used to identify the client, including biometric data (e.g., fingerprint data, face imaging data, and/or voice data), the client's name, address, phone number, policy number, and so on.

The claim (e.g., one of the claims 22) may also be associated with the geographical area of where the client is located (e.g., based on location sensor data, such as a Global Navigation Satellite System sensor, including a Global Positioning System sensor), where the property in the underlying claim is located (e.g., based on address information), and/or where an incident occurred. The geographical area may be stored as part of the claim (e.g., a field of the claim in the insurance database 14), as part of the client profile (e.g., a field of one of the client profiles 20 in the insurance database 14), and/or as information separate from the claim and the client profile, but linked to the claim (e.g., via a pointing or linking information that may be stored in the insurance database 14). The geographical area may be of any suitable scope, such as address, street, neighborhood, city, county, zip code, state, country, and so on.

At block 54, the insurance computing system 12 identifies similar insurance claims associated with the geographical area. In particular, the insurance computing system 12 may send a query to the insurance database 14 for a subset of the claims 22 that were submitted in the same geographical area. Similar insurance claims may include those that are filed for the same type of damage, approximately the same damage amount, and so on. For example, a natural disaster (e.g., hail storm, flood, hurricane, tornado, volcanic eruption, earthquake, tsunami, storm, mud slide, or other weather or geologic process) that affected a certain geographical area (e.g., a neighborhood, a city, a county, a state, or the like) may lead to similar claims, such as property damage (e.g., vehicle and/or home damage) in that geographical area. Additionally or alternatively, the certain geographical area can be defined by a setting a point (e.g., a physical address) and providing a radial distance from the point (e.g., 1 to 5 miles, 5 to 50 miles, 50 to 250 miles, 250 to 1000 miles) to be included in the geographical area. As such, a client may file a claim (for submission as one of the claims 22) for hail damage suffered by an insured vehicle. The insurance computing system 12 may query the insurance database 14, to search for claims in the geographical area that are related to the same type of claim or cause of damage (e.g., by the natural disaster).

In some embodiments, search results for one or more geographical areas may be stored in the cache 24 (e.g., a database) that provides lower latency and/or faster search results, such as a locally stored database, a local cache, a database cache, a remote cache, or the like. For example, the search results may correspond to frequently requested search queries, and thus provide faster search times and more efficient searching for a geographical area. As a specific example, if a geographical area has undergone a natural disaster (e.g., hurricane, earthquake, flooding, freeze, and so on), then search queries may be frequently requested for a period of time for that geographical area. As such, search results for those search queries for the geographical area may be stored in the cache 24 on the client computing system 16 and/or the insurance computing system 12 instead of the insurance database 14. Retrieving these search results from the cache 24 (which may be stored locally on the client computing system 16 and/or the insurance computing system 12, such that traversing the network 18 may not be necessary for the client computing system 16 and/or the insurance computing system 12 to retrieve the search results) may be faster and more efficient than, for example, performing the searches and receiving search results from a remote database (e.g., the insurance database 14) that may be accessible via the network 18. Moreover, network traffic associated with retrieving the data over the network 18 may be reduced or eliminated altogether, resulting in less network congestion. To keep the cache 24 up-to-date, periodic searches (e.g., once a day, once a week, once every two weeks, once a month) may be performed to update the cached search results. Accordingly, when the insurance computing system 12 sends a query for claims 22 that were submitted in the same geographical area, in such embodiments, the query may be sent to the cache 24 in the client computing system 16 and/or the insurance computing system 12 instead of the insurance database 14 for better search performance, reduced network traffic, and/or more efficient overall system resource management.

At block 56, the insurance computing system 12 determines a first set of fraud indicators associated with the filed insurance claim based on similar insurance claims (e.g., a claim with the same underlying claim type as the filed insurance claim). A fraud indicator may indicate a likelihood of fraud associated with the filed claim. Examples of fraudulent indicators may include client patterns (e.g., a tendency to park a vehicle in a structure or in an exposed area, regular operation of a sprinkler system, resource usage, time of day, date, season), property purchase history (e.g., a purchase of an appliance, vehicle, pet, and so on, within a threshold time period), client history (e.g., a propensity to file insurance claims, criminal history), or any other suitable factor that may indicate a fraudulent claim. The fraudulent indicator may correspond to a claim type. A claim type may include, property damage, home damage, automobile damage, food loss, physical injury, collision coverage, generally liability, and so on. As an illustrative example, a fraudulent indicator related to a tendency to park a vehicle in a structure or in an exposed area may correspond to an automobile damage claim type.

In some embodiments, fraud indicators may have been previously determined based on analysis of insurance claims that have been determined to be fraudulent. For example, the insurance computing system 12 may determine and/or receive the fraud indicators as selected and/or entered by one or more clients. That is, the insurance provider may determine characteristics of insurance claims that indicate fraud (e.g., by analyzing past fraudulent insurance claims), and identify such characteristics as fraud indicators. In additional or alternative embodiments, the insurance computing system 12 may use machine learning algorithms to determine the fraud indicators. That is, the insurance computing system 12 may generate or receive a mathematical model by receiving sample data (e.g., insurance claims that have been identified as fraudulent and insurance claims that have been identified as not fraudulent), predicting whether an insurance claim of the sample data is fraudulent, and receiving an indication of whether the prediction was true or false. The insurance computing system 12 may then extract characteristics of insurance claims that indicate fraud and identify such characteristics as fraud indicators.

With respect to block 56, the insurance computing system 12 determines a first set of these predetermined fraud indicators that are associated with the submitted insurance claim 22. In particular, the insurance computing system 12 may determine characteristics of the submitted insurance claim 22 (e.g., type of claim, time of day, date, month, season), and compare to other claims that have similar or identical characteristics. The insurance computing system 12 may determine whether fraud indicators associated with the other claims also exist for the submitted insurance claim 22.

In some embodiments, the insurance computing system 12 may use machine learning algorithms to determine the presence of the fraud indicators. That is, the insurance computing system 12 may build a mathematical model by receiving sample data (e.g., information from the client profile 22, claims 20, and/or insurance database 14), predicting the presence of a fraud indicator, and receiving an indication of whether the prediction was true or false. The insurance computing system 12 may then apply the mathematical model to the information received from the insurance database 14 (including the claim 22) and determine a likelihood of whether or not one of the fraud indicators are present.

The insurance computing system 12 may also or alternatively identify one or more anticipated claims similar to or typically associated with the submitted claim. That is, the insurance computing system 12 may query the insurance database 14 and identify, using, for example, machine learning or artificial intelligence techniques, one or more claims for damage from a certain cause that is typically associated with (e.g., that would be filed simultaneously or subsequently with) the submitted claim. For example, the submitted claim may indicate damage to an insured vehicle due to a hail storm that occurred when the vehicle was located outside of an insured home. The insurance computing system 12 may determine that the anticipated claim is likely to be submitted for the insured home due to the hail storm simultaneously or subsequently with the submitted claim. The insurance computing system 12 may use this correlation to determine that the first set of fraud indicators may be present for the claim submitted for damage to the vehicle. That is, the insurance computing system 12 may determine a fraud indicator as the absence of the anticipated claim with respect to the submitted claim.

The insurance computing system 12 may determine that a fraud indicator exists based on how a client treats the property at issue and/or a client's behavior with respect to their property. For example, the submitted claim may indicate that the client's vehicle was damaged in a hailstorm while parked outside at the client's home. The insurance computing system 12 may query the client's profile and determine that the client indicated that the client typically keeps their car parked indoors (e.g., in a garage). The insurance computing system 12 may use this information to determine that a fraud indicator may be present for the claim submitted for the vehicle, as hail damage may only occur for the car if it is exposed (e.g., outdoors). As such, the insurance computing system 12 may identify a discrepancy between the client's profile and the claim filed for the client. This discrepancy may be identified as indicative of the presence of the first set of fraud indicators.

In another embodiment, the insurance computing system 12 may determine that a number of similar claims in the geographical area may be associated with (e.g., submitted by) a service provider (e.g., contract worker or contractor). In such instances, the insurance computing system 12 may query the insurance database 14 and receive information, such as a criminal background history report, to determine if the service provider has a history of fraud-related crimes. Accordingly, the insurance computing system 12 may determine that a fraud indicator is present based on the association of the service provider with the submitted claim and the fraud-related history of the service provider.

In one embodiment, the insurance computing system 12 may determine that a fraud indicator is present based on a date that the claim was submitted and/or a date that coverage associated with the claim begins or changes. For example, a client's property may suffer damage or loss, for which the client did not have coverage. The client may purchase the coverage shortly after the damage or loss, and then file a fraudulent claim on the damage or loss. For example, the client may not have had comprehensive insurance on his or her automobile, which then gets stolen. The client then purchases comprehensive insurance, and then files a fraudulent claim for the stolen automobile. As such, the insurance computing system 12 may determine that a fraud indicator is present if the date of submission of the claim and the date that coverage for which the claim is filed begins is within a threshold range (e.g., within a day, within two days, within a week, within two weeks, within a month, and so on).

At block 58, the insurance computing system 12 determines the second set of fraud indicators based on a client profile (e.g., one of the client profiles 20) associated with the client that filed the claim. As previously mentioned, the second set of fraud indicators indicates an increased likelihood of fraud associated with the submitted claim based on information provided about the client (e.g., through the client profile). In some embodiments, the insurance computing system 12 may use machine learning algorithms to determine the presence of the second set of fraud indicators. The information associated with each client in a respective client profile (of the client profiles 20) may include the number of claims previously submitted, the type of claims previously submitted, if any previous submission was determined to be fraudulent (e.g., client claim history), a criminal history of the client, and so on. Specifically, the client profile associated with the submitted claim may store criminal history relating to crimes that involve fraud-like behavior (e.g., theft, fraud, embezzlement, identity theft, and forgery) that may facilitate determining, by the insurance computing system 12, the presence of the second set of fraud indicators.

For example, the client profile associated with the submitted claim may include information indicating that the client that submitted the insurance claim has a record on their criminal history that indicates a previous charge or conviction for forgery. In some embodiments, the insurance computing system 12 may use such information relevant to fraud-related crimes from the client profile to determine that the second set of fraud indicators may be present in the claim.

At block 60, the insurance computing system 12 determines the third set of fraud indicators based on a type of the insurance claim. The third set of fraud indicators indicates an increased likelihood of fraud associated with the submitted claim based on the type of insurance claim that is associated with the submitted claim. For example, the type of insurance claim may include food spoilage, vehicle damage, home damage, lost or stolen jewelry, among other things. Such categories may be designated as having high potential for fraud (e.g., a higher occurrence of fraud compared to an average occurrence of fraud for insurance claims) based on a nature of the claim, historical data, recent data within a geographic area, or the like. In some embodiments, the insurance computing system 12 may access the claims 22 of the insurance database 14 to determine a frequency of reported claims associated with a geographical area. For example, the information may show that there is an increase in claims being filed for food spoilage in the geographic area. This increase in certain types of claims could be due to the clients in the geographical area realizing that claims are being processed without additional information, which may lead to an increase in filed claims. In another embodiment, the insurance computing system 12 may access the insurance database 14 to review information, such as a crime incident report and/or fraud report, to determine if information relating to fraud and a certain type of claim are increasing in frequency in a designated geographical area. As such, the insurance computing system 12 may determine that the third set of fraud indicators may be present in a particular claim for food spoilage in the geographic area where there is an increase in claims for food spoilage. In some embodiments, the insurance computing system 12 may use machine learning algorithms to determine the presence of the third set of fraud indicators.

In another embodiment, the type of the third set of fraud indicators may be present in the filed claim based on the type of the insurance claim, without associating the geographical area. For example, a certain type of fraudulent claim may be trending on one or more social media websites or software applications. In another example, the certain type of fraudulent claim may be spreading by word of mouth. The trend may teach or encourage individuals that these claims are more validated with little or no scrutiny, so that individuals can easily and unlawfully obtain money from insurance companies. As such, the insurance computing system 12 may determine that the third set of fraud indicators may be present in a claim that follows a social trend. In this manner, the insurance computing system 12 may determine that the third set of fraud indicators is present in the filed claim.

At block 62, the insurance computing system 12 generates a risk score associated with the claim based on the first, second, and third set of fraud indicators. The insurance computing system 12 may determine if the likelihood of fraud associated with submitted claim exceeds a tolerance or threshold set by the insurance provider using the risk score. In some embodiments, the insurance computing system 12 may assign each of the first, second, and third set of fraud indicators a score such that the risk score may be an accumulation of the first, second, and third fraud indicators. In such embodiments, the insurance computing system 12 may use a scale to assign a value to the fraud indicators, such that a higher number may indicate a higher likelihood of fraud. For example, the insurance computing system 12 may determine that there are a large number of similar insurance claims in the geographical area (e.g., greater than a threshold number of claims, such as 5-1000 claims, 10-100 claims, 25-75 claims, and so on) and that the first set of fraud indicators may be relatively low on the scale. Alternatively, the insurance computing system 12 may determine that there are little or no similar claims in the geographical area (e.g., less than the threshold number) such that the submitted claim may be relatively higher on the scale.

In some embodiments, the insurance computing system 12 may generate the risk score by weighting each of the first, second, and third set of fraud indicators and accumulating the weighted fraud indicators. The weights may correspond to a relevance or confidence level of the fraud indicators. That is, if the first set of indicators is more likely to indicate fraud than the second set of indicators, then the first set of indicators may be weighted more heavily (e.g., weighted with a greater weight) than the second set of indicators. For example, if the first set of fraud indicators has a 60% confidence level that a fraud is likely, the second set of fraud indicators has a 30% confidence level that a fraud is likely, and the third set of fraud indicators has a 10% confidence level that a fraud is likely, then the risk score may be made up by applying a 60% weight to the first set of fraud indicators, a 30% weight to the second set of fraud indicators, and a 10% weight to the third set of fraud indicators and then summing or otherwise combining the weighted indicators. Weighting may be variable and capable of adjustments based on an algorithm (e.g., a learning algorithm), artificial intelligence, an evolutionary algorithm, or the like, which take into account data (e.g., historical data or real-time data) from previous outcomes.

At block 64, the insurance computing system 12 determines if the risk score exceeds a threshold risk number. The risk score exceeding the threshold risk number may indicate that the submitted claim is fraudulent or likely fraudulent (e.g., that the submitted claim may bear additional scrutiny to confirm that the claim is fraudulent). The risk score being less than or equal to the threshold risk number may indicate that the submitted claim is not fraudulent or not likely fraudulent (e.g., that there is no or little indication that the submitted claim is fraudulent or that any indication of fraud is minimal, negligible, or within acceptable standards). The threshold risk number may vary in geographical areas, as risk tolerance may shift due to, for example, socioeconomic statistics, crime statistics, and/or fraud statistics that may be associated with a respective geographical area. For example, the insurance database 14 may determine that a first geographical area has a relatively low risk tolerance because the first geographical area is associated with lower (e.g., lower than average and/or a threshold) crime statistics related to fraud. As another example, the insurance database 14 may determine that a second geographical area has a higher risk tolerance than the first geographical area because crime statistics related to fraud for the second geographical area is higher than crime statistics related to fraud for the first geographical area. As such, a risk score for a claim may exceed the threshold risk number in the first geographical area, but not the second geographical area.

If the threshold risk number is not exceeded, at block 66, the insurance computing system 12 determines that the submitted claim is not fraudulent (e.g., likely not fraudulent) and proceeds to validate the submitted claim, and may eventually make a payout to the client. The insurance computing system 12 may notify the client via the client computing device 16 through a smart phone application, e-mail, or a short messaging service (SMS) that their claim has been validated, and no additional information is needed. For example, if a client submits a claim for food spoilage and the insurance computing system 12 determines that the risk score generated for the claim does not exceed a threshold risk number, then it may proceed to validate the food spoilage claim (e.g., the damages, the absence of fraud, among other things). If the validation process is completed, then the client would eventually receive funds associated with the submitted claim.

If the threshold risk number is exceeded, at block 68, the insurance computing system 12 determines that the submitted claim is fraudulent (or likely fraudulent), stops or interrupts the validation process, and notifies the client computing system 16 to contact a service representative. For example, the insurance computing system 12 may cause the graphical user interface executing on the client computing device 16 to display a prompt indicating that the validation process is stopped. In the case where the client is still entering information into the graphical user interface, the insurance computing system 12 may cause the graphical user interface to interrupt the client from entering information by, for example, graying out fields of the graphical user interface, at least partially covering the graphical user interface to prevent or block the client from further entering information, and so on. In some embodiments, the notification to contact the service representative may be by a smart phone application, e-mail, or SMS. The notification may prompt the client to contact a service representative to provide additional information. For example, if a client submits a claim for food spoilage and the insurance computing system 12 determines that the risk score generated for the claim exceeds a threshold risk number, then it may proceed by notifying the client to contact a service representative for further assistance. In this manner, insurance companies may validate an insurance claim while decreasing or minimizing the need for a human adjuster to check for fraud, which leads to a more efficient and streamlined process for clients to receive funds associated with their insurance claims.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
one or more processors; and
memory communicatively coupled to the one or more processors, the memory storing instructions which, when executed by the one or more processors, cause the one or more processors to:
  generate a mathematical model by receiving a plurality of insurance claims, generating a prediction of whether each insurance claim of the plurality of insurance claims is fraudulent, and receiving an indication of whether the prediction is true or false;
  store one or more search results in a local cache, wherein the one or more search results comprise one or more fraudulent claims associated with a first geographic area;
  receive an insurance claim comprising one or more claim characteristics, wherein the insurance claim comprises location data associated with a location of the insurance claim;
  determine a second geographic area based on the location data of the insurance claim, wherein the second geographic area comprises a radius extending from the location;
  query the local cache based on the second geographic area, wherein querying the local cache produces quicker search results when compared to querying a remote database;
  receive the one or more fraudulent claims associated with the first geographic area from the one or more search results stored in the local cache, wherein the second geographic area is associated with the first geographic area, and wherein the one or more fraudulent claims comprise one or more fraudulent claim characteristics;
  cause the mathematical model to compare the one or more claim characteristics of the insurance claim to the one or more fraudulent claim characteristics of the one or more fraudulent claims;
  cause the mathematical model to determine one or more fraud indicators associated with the insurance claim based on comparing the one or more claim characteristics and the one or more fraudulent claim characteristics, wherein the one or more fraud indicators indicate a likelihood of fraud in the insurance claim;

cause the mathematical model to determine whether the insurance claim is likely fraudulent based on the one or more fraud indicators; and in response to the mathematical model determining that the insurance claim is likely fraudulent:

terminating the insurance claim validation process for the insurance claim; and sending a notification to contact a service representative.

2. The system of claim 1, wherein the instructions cause the one or more processors to cause the mathematical model to determine the one or more fraud indicators based on one or more shared characteristics that the one or more fraudulent claim characteristics have in common with the one or more claim characteristics.

3. The system of claim 2, wherein the one or more shared characteristics comprise a claim type, a type of damage, a damage amount, or any combination thereof.

4. The system of claim 1, wherein the instructions cause the one or more processors to cause the mathematical model to determine that the insurance claim is likely fraudulent by:

generating a risk score based on the one or more fraud indicators; and determining that the risk score exceeds a threshold value.

5. The system of claim 4, wherein the instructions cause the one or more processors to determine the threshold value based on the first geographical area.

6. The system of claim 1, comprising an insurance database communicatively coupled to the one or more processors via a communication network, wherein the instructions cause the one or more processors to cause the mathematical model to determine the one or more fraud indicators associated with the insurance claim by querying the insurance database.

7. The system of claim 6, comprising the local cache, wherein the instructions cause the one or more processors to:

cause the mathematical model to determine the one or more fraud indicators associated with the insurance claim based on the second geographical area associated with the insurance claim; and store data from querying the insurance database in the local cache.

8. The system of claim 7, wherein the instructions cause the one or more processors to:

receive an additional insurance claim associated with the second geographical area; and cause the mathematical model to determine the one or more fraud indicators associated with the additional insurance claim by receiving the one or more fraud indicators from querying the insurance database stored in the local cache.

9. The system of claim 1, wherein the instructions cause the one or more processors to cause the mathematical model to determine the one or more fraud indicators associated with the insurance claim based on using one or more machine learning algorithms.

10. The system of claim 1, wherein the instructions cause the one or more processors to:

receive a first set of insurance claims, wherein the first set of insurance claims comprise one or more fraudulent claims and one or more not fraudulent insurance claims;

cause the mathematical model to predict whether one or more insurance claims of the insurance claims are fraudulent;

receive an indication of whether each of the one or more insurance claims is fraudulent;

based on the received indication, cause the mathematical model to determine one or more not fraudulent claim characteristics and one or more fraudulent claim characteristics associated with the first set of insurance claims;

cause the mathematical model to compare the one or more claim characteristics of the insurance claim to the one or more not fraudulent claim characteristics and the one or more fraudulent claim characteristics associated with the first set of insurance claims; and cause the mathematical model to determine the one or more fraud indicators associated with the insurance claim based on comparing the one or more claim characteristics to the one or more not fraudulent claim characteristics and the one or more fraudulent claim characteristics associated with the first set of insurance claims.

11. A method comprising:

generating, via at least one processor, a mathematical model by receiving a plurality of insurance claims, generating a prediction of whether each insurance claim of the plurality of insurance claims is fraudulent, and receiving an indication of whether the prediction is true or false;

storing, via the at least one processor, one or more search results in a local cache, wherein the one or more search results comprise one or more fraudulent claims associated with a first geographic area;

receiving, via the at least one processor, an insurance claim comprising one or more claim characteristics, wherein the insurance claim comprises location data associated with a location of the insurance claim;

determining, via the at least one processor, a second geographic area based on the location data of the insurance claim, wherein the second geographic area comprises a radius extending from the location;

querying, via the at least one processor, the local cache based on the second geographic area, wherein querying the local cache produces quicker search results when compared to querying a remote database;

receiving, via the at least one processor, the one or more fraudulent claims associated with the first geographic area from the one or more search results stored in the local cache, wherein the second geographic area is associated with the first geographic area, and wherein the one or more fraudulent claims comprise one or more fraudulent claim characteristics;

causing the mathematical model to compare, via the at least one processor, the one or more claim characteristics of the insurance claim to the one or more fraudulent claim characteristics of the one or more fraudulent claims;

causing the mathematical model to determine, via the at least one processor, one or more fraud indicators associated with the insurance claim based on comparing the one or more claim characteristics and the one or more fraudulent claim characteristics, wherein the one or more fraud indicators indicate a likelihood of fraud in the insurance claim;

causing the mathematical model to determine, via the at least one processor, that the insurance claim is likely fraudulent based on the one or more fraud indicators; and in response to the mathematical model determining that the insurance claim is likely fraudulent, sending, via the at least one processor, a notification to contact a service representative.

12. The method of claim 11, wherein causing the mathematical model to determine the one or more fraud indicators associated with the insurance claim comprises causing the mathematical model to determine, via the at least one processor, a first set of fraud indicators based on one or more shared characteristics that the one or more fraudulent claim characteristics have in common with the one or more claim characteristics.

13. The method of claim 12, wherein causing the mathematical model to determine the one or more fraud indicators associated with the insurance claim comprises determining, via the at least one processor, a second set of fraud indicators based on a client profile associated with the insurance claim.

14. The method of claim 13, wherein the second set of fraud indicators is based on a claim history of the client profile, a criminal background of the client profile, or both.

15. The method of claim 13, wherein causing the mathematical model to determine the one or more fraud indicators associated with the insurance claim comprises determining, via the at least one processor, a third set of fraud indicators based on a type of the insurance claim, and wherein the third set of fraud indicators is based on the type of the insurance claim having a high potential for fraud.

16. The method of claim 15, wherein causing the mathematical model to determine that the insurance claim is likely fraudulent based on the one or more fraud indicators comprises determining, via the at least one processor, an algorithm output based on assigning a first weighting factor to the first set of fraud indicators, a second weighting factor to the second set of fraud indicators, and a third weighting factor to the third set of fraud indicators, and comparing the algorithm output to a threshold.

17. One or more non-transitory computer-readable media storing instructions that, when executed by at least one processor, cause the at least one processor to:
generate a mathematical model by receiving a plurality of insurance claims, generating a prediction of whether each insurance claim of the plurality of insurance claims is fraudulent, and receiving an indication of whether the prediction is true or false;
store one or more search results in a local cache, wherein the one or more search results comprise one or more fraudulent claims associated with a first geographic area;
receive an insurance claim comprising one or more claim characteristics, wherein the insurance claim comprises location data associated with a location of the insurance claim;
determine a second geographic area based on the location data of the insurance claim, wherein the second geographic area comprises a radius extending from the location;
query the local cache based on the second geographic area, wherein querying the local cache produces quicker search results when compared to querying a remote database;
receive the one or more fraudulent claims associated with the first geographic area from the one or more search results stored in the local cache, wherein the second geographic area is associated with the first geographic area, and wherein the one or more fraudulent claims comprise one or more fraudulent claim characteristics;
cause the mathematical model to compare the one or more claim characteristics of the insurance claim to the one or more fraudulent claim characteristics of the one or more fraudulent claims;
cause the mathematical model to determine one or more fraud indicators associated with the insurance claim based on comparing the one or more claim characteristics and the one or more fraudulent claim characteristics, wherein the one or more fraud indicators indicate a likelihood of fraud in the insurance claim;
cause the mathematical model to determine whether the insurance claim is likely fraudulent based on the one or more fraud indicators;
in response to the mathematical model determining that the insurance claim is likely fraudulent:
terminate the claim validation process for the insurance claim; and
send a notification to contact a service representative; and
in response to the mathematical model determining that the insurance claim is not likely fraudulent, validate the insurance claim.

18. The one or more non-transitory computer-readable media of claim 17, wherein the insurance claim is associated with hail damage, and the one or more fraud indicators comprise an indication that a vehicle is typically parked in a garage.

19. The one or more non-transitory computer-readable media of claim 17, wherein the one or more fraud indicators comprise a date that the insurance claim was submitted, a date that coverage associated with the insurance claim began or changed, or both.

20. The one or more non-transitory computer-readable media of claim 17, wherein the instructions, when executed by the at least one processor, cause the at least one processor to cause the mathematical model to determine whether the insurance claim is likely fraudulent based on weighting each of the one or more fraud indicators with a respective weighting factor in an algorithm and comparing an output of the algorithm with a threshold value.

* * * * *